(12) United States Patent
Walder et al.

(10) Patent No.: US 7,074,289 B2
(45) Date of Patent: Jul. 11, 2006

(54) METHOD FOR PREPARING LAMINATING MATERIALS

(76) Inventors: Anthony Joseph Walder, 8 Essex Reach Rd., Essex, MA (US) 01929; Richard Allen Barnes, 49 King Philip Ave., South Deerfield, MA (US) 01373; James Michael Touchette, 3851 Springside Dr., Estero, FL (US) 33928

( * ) Notice: Subject to any disclaimer, the term of this patent is extended or adjusted under 35 U.S.C. 154(b) by 342 days.

(21) Appl. No.: 10/136,198

(22) Filed: May 1, 2002

(65) Prior Publication Data

US 2003/0205314 A1 Nov. 6, 2003

(51) Int. Cl.
*B29C 47/00* (2006.01)
(52) U.S. Cl. .......... 156/209; 156/244.24; 156/244.26; 156/247; 156/249; 156/289
(58) Field of Classification Search .......... 156/244.11, 156/244.27, 244.29, 247, 244.26, 289, 249; 427/207.1, 208.4
See application file for complete search history.

(56) References Cited

U.S. PATENT DOCUMENTS

| | | | | |
|---|---|---|---|---|
| 2,537,311 A * | 1/1951 | Lyon | .......................... | 264/175 |
| 3,622,440 A * | 11/1971 | Snedeker et al. | ........... | 428/429 |
| 4,010,311 A * | 3/1977 | Lewis et al. | ................. | 428/412 |
| 4,906,421 A * | 3/1990 | Plamthottam et al. | ...... | 264/471 |
| 4,952,459 A * | 8/1990 | Thatcher | ..................... | 428/426 |
| 5,507,902 A | 4/1996 | Wyner et al. | ................ | 156/209 |
| 6,060,009 A | 5/2000 | Welygan et al. | ............ | 264/167 |
| 6,296,732 B1 | 10/2001 | Enlow et al. | ................ | 156/209 |
| 6,336,988 B1 | 1/2002 | Enlow et al. | ................ | 156/238 |
| 2002/0119292 A1* | 8/2002 | Venkatasanthanam et al. | ... | 428/174 |

\* cited by examiner

*Primary Examiner*—Sam Chuan Yao
*Assistant Examiner*—Barbara J. Musser
(74) *Attorney, Agent, or Firm*—Deborah A. Basile; Karen K. Chadwell

(57) ABSTRACT

A method for preparing laminating materials and a composite prepared therefrom, the method including providing at least one layer of interleaf, extruding a thermoplastic adhesive with a die, forming a composite by applying the at least one layer of interleaf to the adhesive before cooling the adhesive, and pressing the composite with rolls to adhere the at least one layer of interleaf to the adhesive.

17 Claims, 2 Drawing Sheets

METHOD FOR PREPARING LAMINATING MATERIALS

FIELD OF THE INVENTION

The invention relates generally to extruding plastics, and more specifically, to preparation of a thermoplastics adhesive for lamination of a composite.

BACKGROUND OF THE INVENTION

To extrude plastics, one may use an extruder, sheet die, and an embossing-stack. In one example, a thermoplastic adhesive is extruded through the die into cylinders of the embossing-stack, where the adhesive is formed into a film. The surface of the film is embossed with a finish and then the film is cooled. The cylinders of the embossing-stack have an embossed surface, which they impart onto a thermoplastic sheet. The cooled thermoplastic sheet may be collected on a roll or cut using a single layer of interleaf material to separate consecutive wraps or layers.

In another example, film is extruded from an extruder through sheet die onto one interleaf while the film is still thermoplastic. From a position that is near to the sheet die, the film and the interleaf layer are simultaneously pulled by a set of nip rolls that press the film and interleaf layer together while the film is still relatively warm. During this process, the texture of the interleaf layer is impressed in the film. The film and interleaf layer are lightly bonded together so that the interleaf layer can later be peeled.

It is believed that in the above method of preparing a thermoplastic sheet, stress is added to the sheet when the film is pulled off of the collection roll and this stress adversely affects the performance of the sheet in the preparation of a laminate. Consequently, the adverse effects from the stress may show up in the final laminated product.

SUMMARY OF THE INVENTION

The present invention provides methods for preparing laminating materials and composites produced from the methods. In one embodiment, the method includes providing at least one layer of interleaf, extruding a thermoplastic adhesive with a die, forming a composite by applying the at least one layer of interleaf to the adhesive before cooling the adhesive, and pressing the composite with rolls to adhere the at least one layer of interleaf to the adhesive.

In a second embodiment, the method includes providing a pair of polyethylene layers of interleaf with a textured surface and a thickness of about 0.5–15 mils, extruding a polyurethane film, having a thickness of about 0.5–250 mils, with a die, forming a composite by applying the layers of interleaf to the polyurethane film, pressing the composite between rolls of an embossing stack, having an embossing surface, adhering the layers of interleaf to the film, impressing the textured surface of the layers of interleaf and the embossing surface into the film, passing the composite into pressure contact with a cooling surface to cool the film on the composite, and collecting the composite.

In a third embodiment, the composite includes at least two layers of interleaf with a surface and an adhesive adhered between the at least two layers. The adhesive is conformed thermoplastically to the surface of each layer.

In a fourth embodiment, the composite includes a pair of layers of polyethylene interleaf, where each layer has a textured surface, and a polyurethane film adhered between the layers of polyethylene interleaf. The film is thermoplastically adhered to the textured surface of each layer.

In a fifth embodiment, the composite includes at least one layer of interleaf with a surface and an adhesive adhered to the at least one layer. The adhesive is conformed thermoplastically to the surface of the at least one layer of interleaf.

BRIEF DESCRIPTION OF THE DRAWINGS

The accompanying drawings, which are incorporated herein and constitute a part of this specification, illustrate the presently preferred embodiments of the invention and, together with the general description given above and the detailed description given below, serve to explain the features of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. It is to be understood that the Figures and description of the invention included herein illustrate and describe elements that are of particular relevance to the present invention, while eliminating, for purposes of clarity, other elements found in typical extruders.

Figure 1:
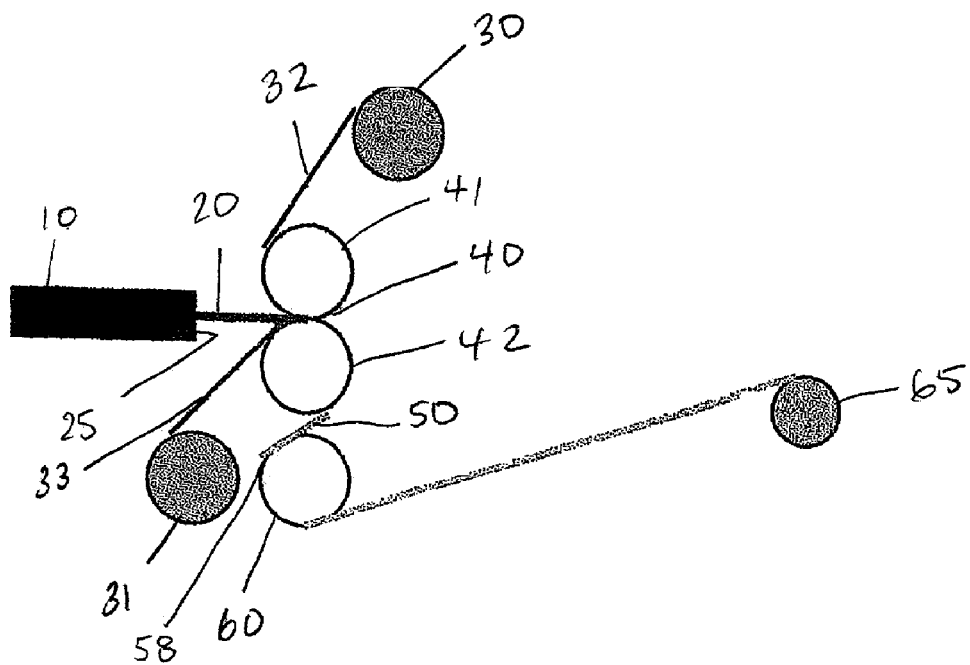
FIG. 1 is a schematic diagram illustrating one embodiment of a method of the invention.

The invention provides a method for preparing laminating materials, or a film, tape, or sheet of plastic, to improve the lamination of a composite product. These laminating materials may be made by extrusion, both vertically and horizontally. As shown in FIG. 1, extruder 10 melts adhesive resin and forms a thermoplastic adhesive layer, or polyurethane film, 20 by passing the molten adhesive through sheet die 25. The extrudate melt temperature may range from about 200° F. to about 500° F., but the preferred temperature is material dependent. The adhesive resin in adhesive 20 may be made of any material that is melt processible or solvent casted and can be formed into a sheet. For example, the adhesive resin may be made of polyurethane, polyvinylbutyrate, polyvinylacetate, polyester, or combinations thereof. The thickness of the adhesive 20, preferably, is controlled by adjusting the speed of production or varying the die opening. In one embodiment, the thickness of the adhesive 20, preferably, is about 0.5 to 250 mils, or more preferably, about 2 to 100 mils.

In one embodiment, rolls 30 and 31 of interleaf layers 32 and 33, respectively, are simultaneously pulled by a roll stack 40. Roll stack 40 includes rolls 41 and 42. In one embodiment, interleaf layers 32 and 33, preferably, have a textured surface 32a or 33a, however, the interleaf layers 32 and 33 may have any desired surface, including no texture or a smooth, or glossy, surface. The desired surface may be chosen to obtain an appearance of the final laminate product. Textured surface 32a or 33a, preferably, has a depth of about 5% to 100% of the thickness of the interleaf layer and, more preferably, has a depth of about 20% to 80% of the thickness of the interleaf layer. Textured surface 32a or 33a may have a random pattern, a diamond pattern, or any other desirable pattern. A pattern allows the adhesive 20 to de-air, which squeezes the air out of the space between interleaf layers 32 and 33 and adhesive 20, as the interleaf layers 32 and 33 come in contact with the adhesive 20. This de-airing will eliminate air bubble defects in the final laminate product. One textured surface 32a may have a different pattern from the other textured surface 33a. Interleaf layers 32 and 33 are preferably polyethylene; however, polypropylene, polyethylene terepthalate ("PET"), and other similar materials that allow interleaf layers 32 and 33 to maintain intimate contact with adhesive 20, maintain its physical properties during pressing, maintain an embossed pattern, and/or have the flexibility to be rolled may be used.

In a preferred embodiment, interleaf layers 32 and 33 each have a thickness of about 0.5 to 15 mils. In a more preferred embodiment, interleaf layers 32 and 33 each have a thickness of about 2 to 6 mils.

Rolls 41 and 42 include metal, silicone and/or rubber outer portions for contacting a laminated product. Rolls 41 and 42 press interleaf layers 32 and 33 to adhesive 20, while adhesive 20 is still heated from the extrusion, to adhere interleaf layers 32 and 33 to adhesive 20 and form a composite 50. While interleaf layers 32 and 33 are pressed against adhesive 20, preferably, textured surfaces 32a and 33a of interleaf layers 32 and 33 are impressed into adhesive 20. This impression of texture decreases the shininess, or glossiness, of adhesive 20. This allows the surface of adhesive 20 to de-air when it is laminated into a composite, provides a surface with a greater roughness, allows adhesive 20 to be more easily positioned during use, and allows for easier de-airation when bonding adhesive 20 to another surface. During de-airation, the texture allows the air to channel out of adhesive 20 as pressure is applied to the surface of adhesive 20. This must be accomplished before adhesive 20 becomes tacky and traps the air.

During pressing, interleaf layers 32 and 33 will not transfer any material to the adhesive 20 that could affect the performance of adhesive 20. In a preferred embodiment, the pressing prevents air from being trapped between adhesive 20 and interleaf layers 32 and 33, which allows for an intimate contact between adhesive 20 and interleaf layers 32 and 33.

Figure 2:
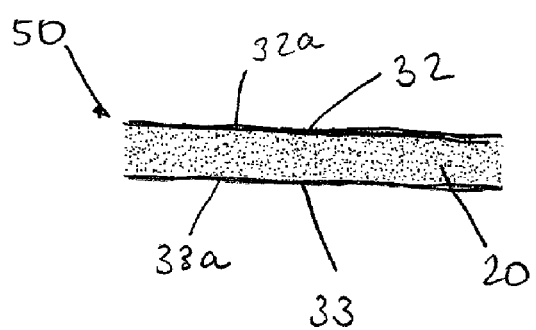
FIG. 2 is a side view of one embodiment of a composite prepared from the method of FIG. 1.

Composite 50 then comes into pressure contact with a cooling surface 58 of roll 60 to cool adhesive 20 in composite 50. The temperature of cooling surface 58 effects the surface characteristics of adhesive 20, so the temperature must allow for cooling of interleaf layers 32 and 33 and texturing of adhesive 20. Accordingly, the temperature is selected depending upon the physical and chemical attributes of the interleaf layer(s) and the adhesive. In a preferred embodiment, cooling surface 58 has a temperature between 40° F. and 200° F., and in a more preferred embodiment, cooling surface 58 has a temperature between about 60° F. and 150° F. After composite 50 moves along roll 60, composite 50 is collected as a unit onto roll 65. Alternatively, composite 50 may be cut to size and stacked as flat sheets without sticking together. In one embodiment, composite 50, as shown in FIG. 2, has interleaf layers 32 and 33 and adhesive 20 therebetween.

In one example using the above method, a composite 50 of AG-5050 0.050×39", an optical urethane provided by Thermedics Polymer Products, Woburn, Mass., was made using two outside interleaf layers 32 and 33 of polyethylene film. The interleaf layers 32 and 33 were 0.004 inches thick and had a random texture on the surface. The AG-5050 extrudate left the sheet die 25 at 340° F. and was joined with the interleaf layers 32 and 33 at rolls 41 and 42. The temperature of roll 41 was 100° F. and roll 42 was 120° F. Composite 50 was then rolled up as finished rolls and packaged for use in security glazing.

In another example using the above method, a composite 50 of AG-5050 0.050×50" was made using two outside interleaf layers 32 and 33 of film. One interleaf layer was 0.004 inch thick polyethylene film that had a random texture. The other interleaf layer was 0.002 inch thick polypropylene film that had a random texture. The AG-5050 extrudate left the sheet die 25 at 335° F. and was joined with the interleaf layers 32 and 33 at rolls 41 and 42. The temperature of roll 41 was 105° F. and roll 42 was 120° F. The composite 50 was then rolled up as finished rolls and packaged for use in security glazing.

Figure 4:
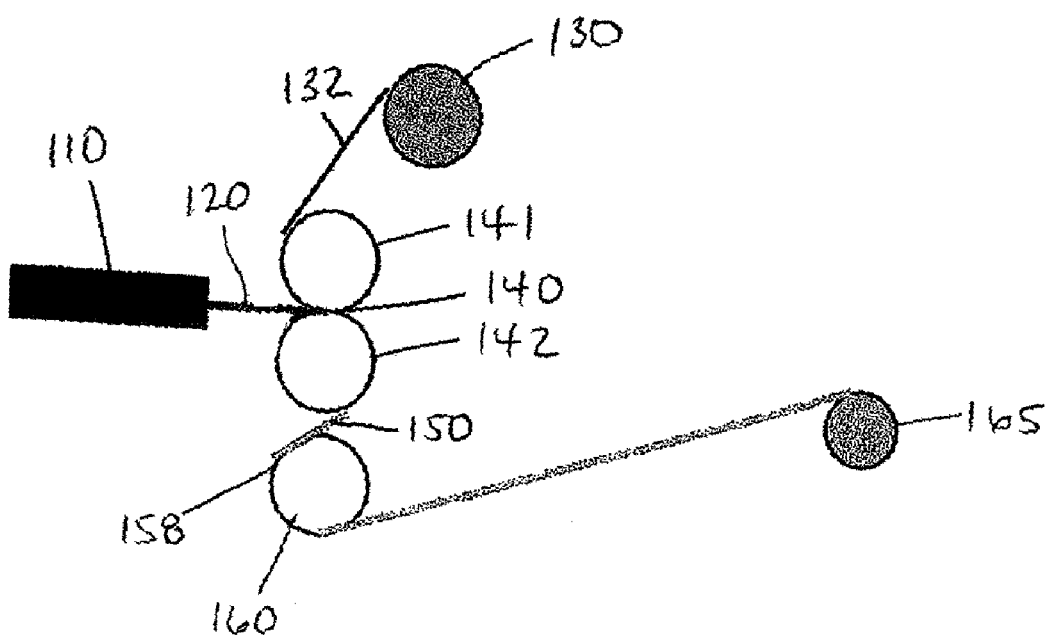
FIG. 4 is a schematic diagram illustrating another embodiment of a method of the invention for preparing the embodiment of a composite of FIG. 3.
Figure 3:
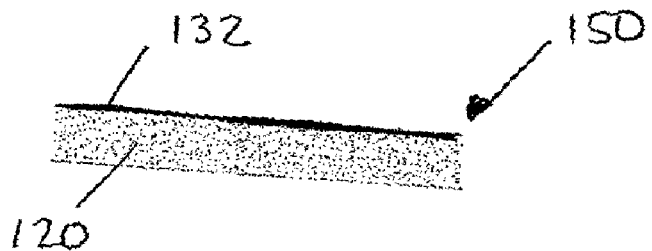
FIG. 3 is a side view of another embodiment of a composite.

In another embodiment, as shown in FIG. 3, the composite 150 has one interleaf layer 132 adhered to the adhesive 120, where interleaf layer 132 may be located on either the top or the bottom of adhesive 120. Similar to the method of making a composite with two interleaf layers described above, extruder 110 melts adhesive resin and forms adhesive layer 120, as shown in FIG. 4. Roll 130 of single interleaf layer 132 is pulled by roll stack 140, which includes rolls 141 and 142. As described above, interleaf layer 132 may have any desired surface and be made of any material that allows interleaf layer 132 to maintain intimate contact with adhesive 120, maintain its physical properties during pressing, maintain an embossed pattern, and/or have the flexibility to be rolled.

Rolls 141 and 142 press interleaf layer 132 to adhesive 120, while adhesive 120 is still heated from the extrusion to adhere interleaf layer 132 to adhesive 120 and form composite 150. While interleaf layer 132 is pressed against adhesive 120, preferably, any textured surface of interleaf layer 132 is impressed into adhesive 120. Interleaf layer 132 will not transfer any material to adhesive 120 that could affect the performance of adhesive 120.

Composite 150 then comes into pressure contact with cooling surface 158 of roll 160 to cool adhesive 120 in composite 150. The temperature of cooling surface 158 must allow for cooling of interleaf layer 132 and texturing of adhesive 120. After composite 150 moves along roll 160, composite 150 is collected as a unit onto roll 165 or cut to size and stacked as flat sheets without sticking together.

During the lamination process, interleaf layers 32 and 33 or 132 are removed so that adhesive 20 or 120 may bond to other materials. When interleaf layers 32 and 33 or 132 are removed, adhesive 20 or 120 may be used in many manufactured products. For example, adhesive 20 or 120 may be used in touch screens, EMI screens, windows, car side windows, computer screens, monitors, television screens, bullet resistant laminates, and many other applications. Composite 50 or 150 is stiffer than adhesive 20 or 120 alone and thus allows for easier handling of adhesive 20 or 120. Interleaf layers 32 and 33 or 132 maintain adhesive 20 or 120 in a clean, uncontaminated state and provide less internal stress on adhesive 20 or 120 by allowing adhesive 20 or 120 to lay flat, or be stacked, during the construction of the final laminate product. By maintaining a low internal stress on adhesive 20 or 120, wrinkles and other defects are prevented, which results in a less stressed final laminate product.

While the invention has been described in detail and with reference to specific embodiments thereof, it will be apparent to one skilled in the art that various changes and modifications can be made therein without departing from the spirit and scope thereof. Thus, it is intended that the invention covers the modifications and variations of this invention provided they come within the scope of the appended claims and their equivalents.

What is claimed is:

1. A method for preparing laminating materials comprising:
   providing two layers of interleaf, wherein each layer of interleaf comprises a textured surface;
   extruding a thermoplastic adhesive with a die said thermoplastic adhesive selected from the group consisting of polyurethane, polyvinylbutyrate, polyvinylacetate, polyester, and combinations thereof;
   forming a composite by applying one layer of interleaf to each of the top and bottom surfaces of the adhesive before cooling the adhesive;
   pressing the composite with rolls to adhere the two layers of interleaf to the adhesive while the adhesive is still thermoplastic such that the textured surface of each layer of interleaf is impressed into the adhesive and impressing an embossed surface of an embossing stack into the adhesive such that the embossed surface is impressed into the adhesive, the embossing stack formed from at least two rolls; and
   using the pressed composite to form a security glazing.

2. The method of claim 1 further comprising:
   cooling the adhesive by passing the composite into pressure contact with a cooling surface after the composite has been pressed; and
   collecting the composite.

3. The method of claim 2 wherein the collecting comprises:
   wrapping the composite as a unit on a roll.

4. The method of claim 2 wherein the collecting comprises:
   cutting and stacking the composite.

5. The method of claim 1 wherein the pressing comprises:
   evacuating air from between the adhesive and the layers of interleaf.

6. The method of claim 1 wherein the extruding comprises:
   providing a polyurethane film having a thickness of about 0.5–250 mils.

7. The method of claim 1 wherein the extruding comprises:
   providing polyurethane film having a thickness of about 2–100 mils.

8. The method of claim 1, wherein the providing comprises:
   supplying the two layers of interleaf, with each layer having a thickness of about 0.5–15 mils.

9. The method of claim 1 wherein the providing comprises:
   supplying the two layers of interleaf, with each layer having a thickness of about 2–6 mils.

10. The method of claim 1 wherein the supplying comprises:
    providing the textured surface, having a depth of about 5% to 100% of a thickness of each layer.

11. The method of claim 1 wherein the providing comprises:
    providing the textured surface, having a depth of about 20% to 80% of a thickness of each layer.

12. The method of claim 1 wherein the textured surface of each of the interleaf layers comprises a random pattern or a diamond pattern.

13. The method of claim 1 wherein each of the layers of interleaf comprises a material selected from the group consisting of polyethylene, polypropylene, PET, and combinations thereof.

14. The method of claim 1 wherein using the pressed composite to form a security glazing comprises:
    removing the layer of interleaf from the top surface of the adhesive;
    applying the top surface of the adhesive to a first substrate;
    removing trapped air between the top surface of the adhesive and the first substrate;
    removing the layer of interleaf from the bottom surface of the adhesive; and
    applying a second substrate to the bottom surface of the adhesive.

15. The method of claim 14 wherein the security glazing comprises touch screens, EMI screens, windows, car side windows, computer screens, monitors, television screens, and bullet resistant laminates.

16. A method for preparing laminating materials comprising:
    providing a pair of layers of polyethylene interleaf, each layer having a textured surface and a thickness of about 0.5–15 mils;
    extruding a polyurethane film, having a thickness of about 0.5–250 mils, with a die;
    forming a composite by applying the first layer of interleaf to a top surface of the polyurethane film and by applying the second layer of interleaf to a bottom surface of the polyurethane film;
    pressing the composite between rolls of an embossing stack, having an embossing surface;
    adhering the layers of interleaf to the film while the film is still thermoplastic;
    impressing the textured surface of the layers of interleaf and the embossing surface into the film;
    passing the composite into pressure contact with a cooling surface to cool the film on the composite;
    collecting the composite; and
    using the collected composite to form a security glazing.

17. The method of claim 16 wherein using the collected composite to form a security glazing comprises:
    removing the first layer of polyethylene interleaf from the composite;
    applying the top surface of the polyurethane film to a first substrate;
    removing trapped air between the top surface of the polyurethane film and the first substrate;
    removing the second layer of polyethylene interleaf from the composite; and
    applying the bottom surface of the polyurethane film to a second substrate;
   wherein the first substrate, the second substrate, and the polyurethane film form the security glazing, wherein the security glazing is used to form a product comprising touch screens, EMI screens, windows, car side windows, computer screens, monitors, television screens, and bullet resistant laminates.

* * * * *